HYBRID AMPLIFIER

Filed Oct. 26, 1964 2 Sheets-Sheet 1

*INVENTOR.*
DONALD H. WHEELER
*BY* V. C. MULLER
ATTORNEY.

INVENTOR.
DONALD H. WHEELER
BY V. C. MULLER
ATTORNEY.

United States Patent Office 3,356,957
Patented Dec. 5, 1967

3,356,957
HYBRID AMPLIFIER

Donald H. Wheeler, China Lake, Calif., assignor to the United States of America as represented by the Secretary of the Navy Filed Oct. 26, 1964, Ser. No. 406,629
9 Claims. (Cl. 330—3)

Figure 1:
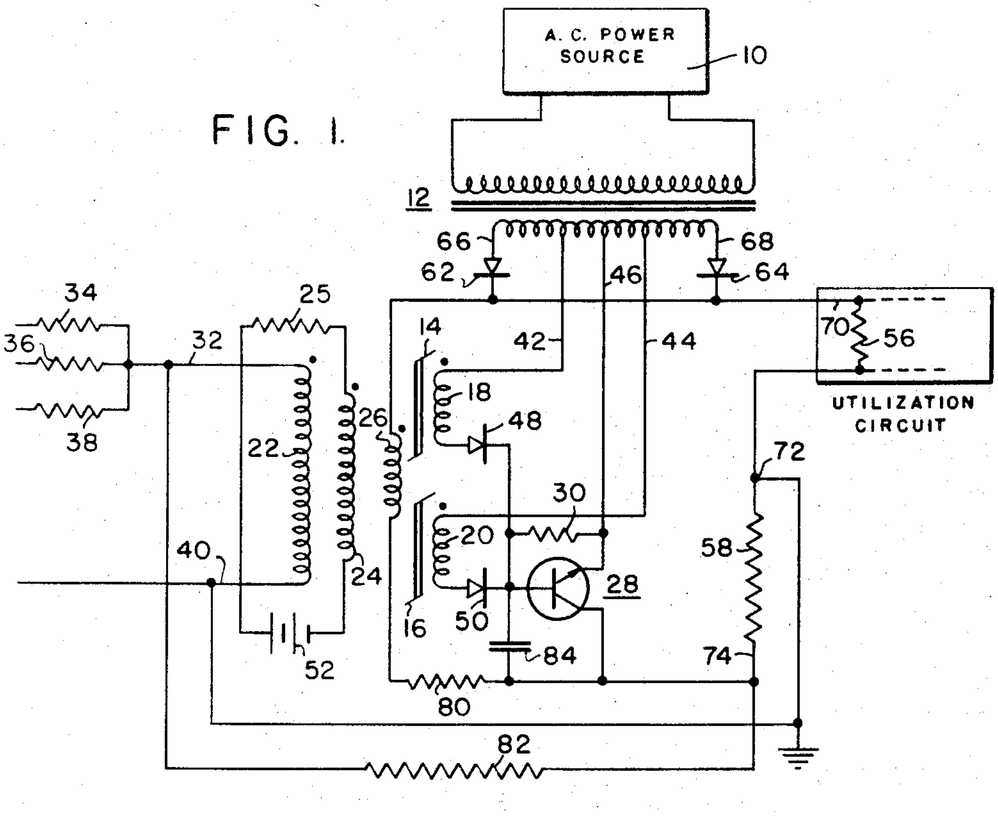

The invention described herein may be manufactured and used by or for the Government of the United States of America for governmental purposes without the payment of any royalties thereon or therefor.

This invention relates to amplifiers, and more particularly to a hybrid amplifier having a saturable-reactor type of amplifier (hereinafter termed a magnetic amplifier) as an input stage in novel combination with a transistor amplifier and load circuit as an output stage, and wherein the output signal is a train of unidirectional pulses having an average value proportional to the magnitude of a unidirectional input signal.

While the hybrid amplifier disclosed herein may of course be employed or adapted for many applications, it will be described exemplarily with reference to an operational amplifier embodiment, specifically intended for airborne bomb-director computer use, wherein the input signal to the amplifier may be simultaneously applied DC voltages which are analogues of input quantities, wherein the amplifier effects summation of these applied DC voltages, wherein the amplifier output signal is a train of unidirectional pulses characterized by an average value linearly proportional to the magnitude of the summation of the applied DC voltages, wherein the magnetic amplifier section of the hybrid amplifier is provided with internal regenerative feedback derived from a train of pulses developed across a portion of the load circuit, and wherein the complete amplifier is provided with external degenerative feedback likewise derived from a train of pulses developed across a portion of the load circuit.

Airborne bomb-director computers (which may each comprise say twenty or more operational amplifiers) have heretofore employed amplifiers solely of magnetic (saturable reactor) type, since such amplifiers present important and advantageous features of simplicity, versatility, ruggedness, stability, accuracy and reliability, although under some penalty of size and weight. While transistorization of vacuum tube type of operational amplifiers yields reduction of computer size and weight, size reduction in particular now being an important requisite for fire control and weapon delivery computers intended for use in modern, light, attack aircraft, transistorization would give rise to several disadvantages such as loss of the flexibility enabled by the two-wire isolated input feature of magnetic amplifiers, and increase in circuit complexities as would be required to overcome severe difficulties posed by poor stability of transistors exposed to the varying temperature environment experienced operationally in military aircraft; heater-cooler arrangements can be devised and employed to control the temperature environment of transistorized equipment, but for airborne use this would inevitably introduce further complexities and increase size requirements.

It is therefore an object of the present invention to provide a hybrid semiconductor-magnetic amplifier circuit enabling amplifier miniaturization and adapted for high-reliability computer applications.

It is another object of the invention to provide a hybrid amplifier having a low-power, high-gain, self-saturating magnetic amplifier input stage, and a transistor amplifier output stage, powered by a single-phase AC excitation source, enabling isolation of the input and output circuits, and effecting significant reduction in amplifier size and weight.

Figure 5:
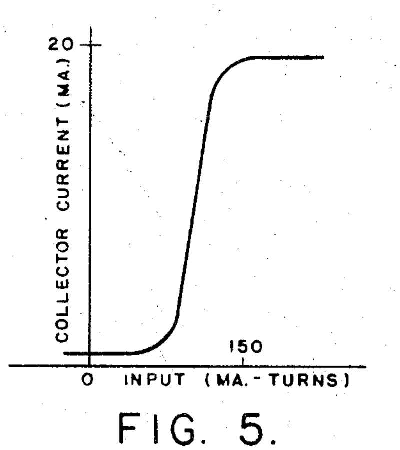
Figure 6:
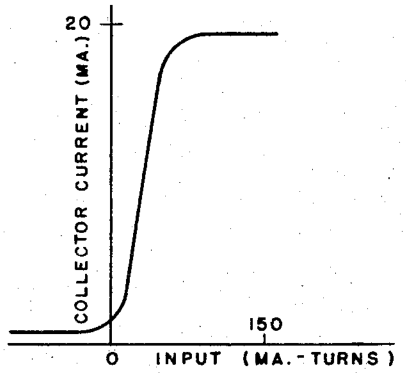
Figure 2:
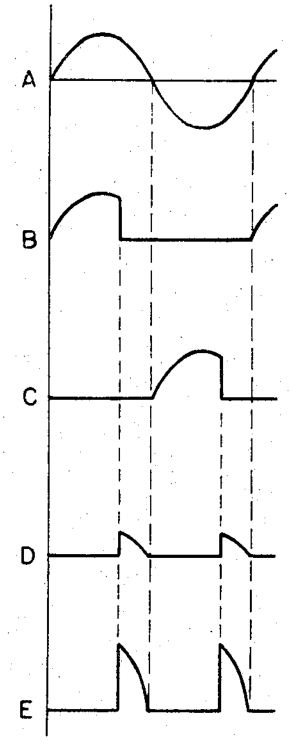
Figure 3:
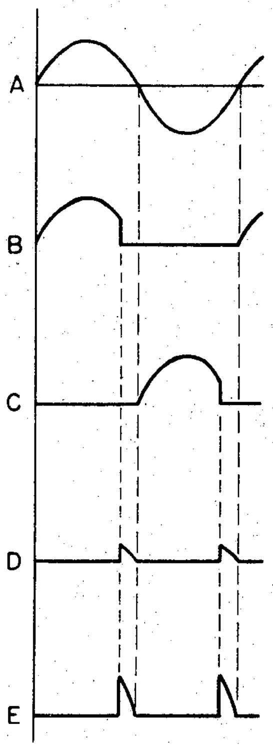
Figure 4:
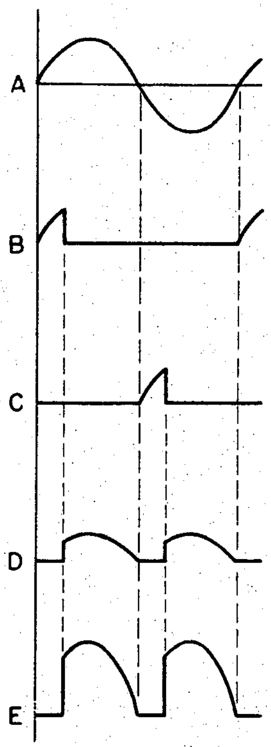
Figure 7:
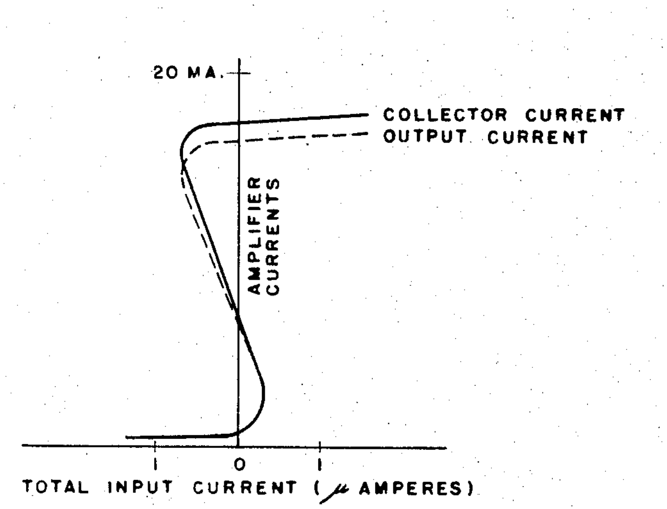

Other objects and many of the attendant advantages of this invention will be readily appreciated as the same becomes better understood by reference to the following description when considered in connection with the accompanying drawing wherein:

FIG. 1 is a schematic circuit of an operational amplifier circuit embodiment of the novel hybrid semiconductor-magnetic amplifier;

FIGS. 2, 3 and 4 each present a series of waveforms, taken at various points in the FIG. 1 circuit, the several series corresponding to differing operating conditions wherein the summation input signals are of intermediate, smaller and larger magnitudes, respectively;

FIG. 5 is a transfer characteristic, pertinent to the FIG. 1 hybrid amplifier, of transistor collector current versus magnetic amplifier input milliampere-turns, under the condition of no core bias and no internal feedback in the magnetic amplifier section;

FIG. 6 is a transfer characteristic, pertinent to the FIG. 1 hybrid amplifier, of transistor collector current versus magnetic amplifier input milliampere-turns, under the condition of initial core bias but with no internal feedback; and FIG. 7 is a closed-loop transfer characteristic, pertinent to the FIG. 1 operational amplifier embodiment of the invention, under the condition of external degenerative feedback, wherein the full-line and broken-line curves indicate the variation of transistor collector current and amplifier output current, respectively, versus hybrid amplifier total input microampere current.

Referring now to the exemplary voltage-summing amplifier embodying the present invention as illustrated in detailed circuitry form in FIG. 1, the hybrid amplifier is powered from AC source 10 through transformer 12 having a sectioned secondary which supplies AC voltages to both the magnetic amplifier and semiconductor (transistor) sections in a manner effecting considerable simplification as to power supply circuit arrangement and requirements. The magnetic amplifier section includes so-called square-loop cores 14 and 16 which are embraced by gate windings 18 and 20, respectively, and with input winding 22, bias winding 24 and feedback winding 26 embracing both cores as indicated. It is of importance to note that there is no distinct cleavage line between the magnetic and transistor amplifier sections since the gate winding circuit of the magnetic amplifier is completed through the base-to-emitter circuit of transistor 28, resistor 30 shunting the latter circuit for current adjustment purposes. The several input voltages, in this instance three, are applied to lead 32 of input winding 22 through resistors 34, 36 and 38, lead 40 serving as the common return for both the input and external feedback circuits as indicated by the ground symbol. The magnetic amplifier section of the hybrid amplifier (including the base-to-emitter circuit which controls operation of transistor 28) is powered by the voltages developed at leads 42 and 44 relative to center-lead 46 of the intermediate sections of the transformer 12 secondary, diodes 48 and 50 serving to limit the voltages effective upon the gate winding circuits to alternate half-cycles (in this instance the positive half-cycles relative to the marked ends of gate windings 18 and 20) of the voltages developed across the transformer 12 secondary intermediate sections. The base-to-emitter section of transistor 28 completes the gate winding circuit, the emitter electrode connecting to center-lead 46 of the transformer 12 secondary in the particular circuit configuration illustrated herein. Bias winding 24 is supplied with a predetermined fixed value of direct current from a source 52, series resistor 25 being included for adjustment of the bias winding current. The transistor output section of the hybrid amplifier, including series-connected resistors 56 and 58 and the collector-to-emitter circuit of transistor 28, is powered by the unfiltered full-wave-rectified voltage provided by diodes 62 and 64 operating in conjunction with the transformer 12 secondary voltages appearing at leads 66 and 68 relative to center-lead 46.

Since the particular application for which the present invention is intended makes use of a train of positive pulses, resistor 56 is here indicated as the effective load resistance of the utilization circuit, the pulses at lead 70 being positive relative to the junction point 72 of the series-connected load resistors 56 and 58. Either alternate or simultaneous use could be made of the train of negative pulses appearing at lead 74 of resistor 58.

Internal regenerative feedback is provided by connecting the feedback winding 26 across the series-connected load resistors 56 and 58, the amplitude of current pulses supplied to the feedback winding being largely dependent upon the value of the series resistor 80 included in the feedback winding circuit.

The operational amplifier circuit is completed by application of a train of degenerative feedback current pulses, derived from the resistor 58 section of the transistor 28 load circuit by means of resistor 82, to input winding 22. Capacitor 84, connected between the base electrode of transistor 28 and the junction point of resistors 58 and 80, has been found useful in overcoming high frequency ringing encountered in some instances.

By way of example, typical voltage and component specifications for the described operational amplifier embodying the invention are as follows:

Cores 18 and 20: Toroidal, aluminum-cased; core itself is tape-wound 1-mil "4–79 Molybdenum Permalloy," 0.571" O.D., 0.313" I.D., 0.202" thickness, made by a number of manufacturers including Arnold Engineering Co., Fullerton, Calif.
Winding 22: 5500 turns No. 43 wire.
Winding 24: 150 turns No. 43 wire.
Winding 26: 50 turns No. 43 wire.
Windings 18 and 20 (each): 1000 turns No. 43 wire.
Transistor 28: 2N1154.
Diodes 48, 50, 62, 64: HD 4420.
Lead 42 and 44 voltages: 400 cycle, 3.2 volts.
Lead 66 and 68 voltages: 400 cycle, 50 volts.
Resistor 25: 20,000 ohms.
Voltage source 52: 10 volts.
Resistor 30: 2000 ohms.
Resistor 56: 500 ohms.
Resistor 58: 1000 ohms.
Resistor 80: 10,000 ohms.
Resistor 82: 2000 ohms.
Capacitor 84: 330 micro-microfarads.

Resistors 34, 36 and 38 may be of values usually ranging between 500 ohms and 10,000 ohms each, depending on computer scaling and the sources of the input voltages applied to these resistors. Such sources are ordinarily of reasonably low impedance, say of less than 10,000 ohms.

Referring now to FIGS. 2, 3 and 4 which concern operation of the disclosed hybrid amplifier in response to summation input signals of intermediate, lesser and greater amplitudes, respectively, curve A in each of the figures illustrates the power source voltage cycle in order to provide a basis for comparison of the remaining curves. Curves B and C illustrate the voltages appearing across gate windings 18 and 20, respectively; curve D illustrates the transistor 28 base current; curve E illustrates the corresponding but greater-amplitude transistor 28 collector current which also passes through utilization circuit load resistor 56. Starting at a flux condition which is dependent upon the sum of the milliampere-turns of windings 22, 24 and 26, the flux level of core 14 moves toward saturation as a result of effective integration during application of the positive-going half-cycle of voltage applied from lead 42 to gate winding 18 (FIG. 1). When saturation is reached, at a half-cycle instant dependent upon the initial flux level, the voltage across gate winding 18 drops to substantially zero value as indicated, and substantially all of the voltage from lead 42 then appears across the base-to-emitter circuit of transistor 28 (FIG. 1), resulting in base current as illustrated by the first pulse in curve D, continuing until substantially the end of that half-cycle of applied voltage. The corresponding collector-to-emitter and utilization load circuit current is illustrated by the first pulse in curve E. During the next half-cycle of the source voltage illustrated at A, the other core 20 and its gate winding circuit take over, the operation being entirely the same as that already described for core 18. Curves E of FIGS. 2, 3 and 4 indicate that the average load circuit current increases directly as the DC input current level, and it is found in practice that this in an essentially linearly proportional relationship.

Referring now to the transfer characteristics shown in FIGS. 5, 6 and 7 which are explanatory of the effect of initial core bias and internal regenerative feedback in the disclosed operational hybrid-amplifier, FIG. 5 illustrates the manner in which average collector current varies with input milliampere-turns of winding 22 under the condition of zero bias and no internal regenerative feedback. In FIG. 6, the core bias has been set to such value as to shift the characteristic sufficiently to the left. The effect of such shift and application of internal regenerative feedback is illustrated in FIG. 7, wherein the total or resultant current to input winding 22 of the operational amplifier correspondingly has become so small that it is negligible as to disturbing effect upon the output current (which is equal to collector current minus feedback current).

Apart from the novel circuitry combination presented by the hybrid amplifier forming the basis of the operational amplifier embodiment described above, and the advantageous size and weight reduction which it affords, it will be understood that the best characteristics of magnetic and semiconductor elements are combined in the hybrid arrangement: the magnetic amplifier section provides temperature stability and long-term stability, while the transistor amplifier section carries the majority of the power required; further, the magnetic amplifier can use a two-wire isolated input, and two-wire isolated outputs can be provided by isolation transformers, enabling retention of computer flexibility. In addition to current-summing and voltage-summing applications, the hybrid amplifier is useful for voltage-to-current conversion. Similarly, the hybrid amplifier is a good current source and thus can operate very satisfactorily into a varying load.

While the invention has been described in terms of an exemplary operational amplifier embodiment, obviously many modifications, variations and other applications are possible in the light of the above teachings. It is therefore also to be understood that within the scope of the appended claims the invention may be practiced otherwise than as specifically described.

What is claimed is:

1. A hybrid amplifier system for conversion of a variable input DC signal to a train of regularly repetitive unidirectional pulses, said system comprising, in combination:

(a) a magnetic amplifier having an input winding for application thereto of said input signal, a bias winding energized by a predetermined fixed value of direct current, and a pair of gate windings;
(b) a first pair of diodes;
(c) a second pair of diodes;
(d) a transistor having base, emitter and collector electrodes;
(e) first and second output resistors;
(f) AC power means for providing a first pair of oppositely-phased sinusoidal voltages of predetermined first magnitude, and a second pair of oppositely-phased sinusoidal voltages in synchronism with said first pair of voltages and of predetermined second magnitude;

(g) one of said pair of gate windings being connected in a series circuit including one of said first pair of diodes, and the base and emitter electrodes of said transistor, and energized by one of said first pair of voltages, and the other of said pair of gate windings being similarly connected in a series circuit including the other of said first pair of diodes, and the base and emitter electrodes of said transistor, and energized by the other of said first pair of voltages, to effect gating of said transistor to an ON condition beginning at an instant, during each half-cycle of said first pair of voltages, varying in accordance with the magnitude of said input signal;

(h) said second pair of oppositely-phased voltages being applied to said second pair of diodes in a manner to provide an unfiltered full-wave-rectified voltage;

(i) said collector and emitter electrodes of said transistor being connected in a series circuit including said first and second output resistors, and energized by said full-wave-rectified voltage, said first and second output resistors having a junction point; and (j) said first and second output resistors serving as load resistors across which are developed a pair of distinct trains of pulses which are polarity-opposed relative to said junction point, and each said train of pulses being characterized by an average value proportional to the magnitude of said input signal.

2. A combination as defined in claim 1, wherein said magnetic amplifier comprises a pair of cores, one of said pair of gate windings embracing one of said pair of cores, the other of said pair of gate windings embracing the other of said pair of cores, and said input, bias and feedback windings embracing each of said pair of cores.

3. A combination as defined in claim 1, wherein said AC power means comprises an AC power source and a transformer energized thereby, said transformer having a tapped secondary supplying both said first pair and said second pair of voltages referenced to a center-lead.

4. A hybrid amplifier system for conversion of a variable input DC signal to a train of regularly repetitive unidirectional pulses, said system comprising, in combination:

(a) a magnetic amplifier having an input winding for application thereto of said input signal, a bias winding energized by a predetermined fixed value of direct current, a feedback winding, and a pair of gate windings;

(b) a first pair of diodes;

(c) a second pair of diodes;

(d) a transistor having base, emitter and collector electrodes;

(e) first and second output resistors;

(f) AC power means for providing a first pair of oppositely-phased sinusoidal voltages of predetermined first magnitude, and a second pair of oppositely-phased sinusoidal voltages in synchronism with said first pair of voltages and of predetermined second magnitude;

(g) one of said pair of gate windings being connected in a series circuit including one of said first pair of diodes, and the base and emitter electrodes of said transistor, and energized by one of said first pair of voltages, and the other of said pair of gate windings being similarly connected in a series circuit including the other of said first pair of diodes, and the base and emitter electrodes of said transistor, and energized by the other of said first pair of voltages, to effect gating of said transistor to an ON condition beginning at an instant, during each half-cycle of said first pair of voltages, varying in accordance with the magnitude of said input signal;

(h) said second pair of oppositely-phased voltages being applied to said second pair of diodes in a manner to provide an unfiltered full-wave-rectified voltage;

(i) said collector and emitter electrodes of said transistor being connected in a series circuit including said first and second output resistors, and energized by said full-wave-rectified voltage, said first and second output resistors having a junction point;

(j) said first and second output resistors serving as load resistors across which are developed a pair of distinct trains of pulses which are polarity-opposed relative to said junction point, and each said train of pulses being characterized by an average value linearly proportional to the magnitude of said input signal; and (k) said feedback winding and a series-connected current-limiting resistor being connected across said series-connected output resistors to provide regenerative internal feedback.

5. A combination as defined in claim 4, wherein said magnetic amplifier comprises a pair of cores, one of said pair of gate windings embracing one of said pair of cores, the other of said pair of gate windings embracing the other of said pair of cores, and said input, bias and feedback windings embracing each of said pair of cores.

6. A combination as defined in claim 4, wherein said AC power means comprises an AC power source and a transformer energized thereby, said transformer having a tapped secondary supplying both said first pair and said second pair of voltages referenced to a center-lead.

7. A hybrid amplifier system for conversion of a variable input DC signal to a train of regularly repetitive unidirectional pulses, said system comprising, in combination:

(a) a magnetic amplifier having an input winding for application thereto of said input signal, a bias winding energized by a predetermined fixed value of direct current, a feedback winding, and a pair of gate windings;

(b) a first pair of diodes;

(c) a second pair of diodes;

(d) a transistor having base, emitter and collector electrodes;

(e) first and second output resistors;

(f) AC power means for providing a first pair of oppositely-phased sinusoidal voltages of predetermined first magnitude, and a second pair of oppositely-phased sinusoidal voltages in synchronism with said first pair of voltages and of predetermined second magnitude;

(g) one of said pair of gate windings being connected in a series circuit including one of said first pair of diodes, and the base and emitter electrodes of said transistor, and energized by one of said first pair of voltages, and the other of said pair of gate windings being similarly connected in a series circuit including the other of said first pair of diodes, and the base and emitter electrodes of said transistor, and energized by the other of said first pair of voltages, to effect gating of said transistor to an ON condition beginning at an instant, during each half-cycle of said first pair of voltages, varying in accordance with the magnitude of said input signal;

(h) said second pair of oppositely-phased voltages being applied to said second pair of diodes in a manner to provide an unfiltered full-wave-rectified voltage;

(i) said collector and emitter electrodes of said transistor being connected in a series circuit including said first and second output resistors, and energized by said full-wave-rectified voltage, said first and second output resistors having a junction point;

(j) said first and second output resistors serving as load resistors across which are developed a pair of distinct trains of pulses which are polarity-opposed relative to said junction point, and each said train of pulses being characterized by an average value linearly proportional to the magnitude of said input signal;

(k) said feedback winding and a series-connected current-limiting resistor being connected across said series-connected output resistors to provide regenerative internal feedback; and (l) said input winding and a series-connected current-dividing resistor being connected across one of said output resistors to effect degenerative external feedback.

8. A combination as defined in claim 7, wherein said magnetic amplifier comprises a pair of cores, one of said pair of gate windings embracing one of said pair of cores, the other of said pair of gate windings embracing the other of said pair of cores, and said input, bias and feedback windings embracing each of said pair of cores.

9. A combination as defined in claim 7, wherein said AC power means comprises an AC power source and a transformer energized thereby, said transformer having a tapped secondary supplying both said first pair and said second pair of voltages referenced to a center-lead.

References Cited

UNITED STATES PATENTS

| | | | |
|---|---|---|---|
| 2,798,904 | 7/1957 | Alexanderson | 330—3 X |
| 3,291,999 | 12/1966 | Lipman. | |

ROY LAKE, *Primary Examiner.*

NATHAN KAUFMAN, *Examiner.*